United States Patent Office 3,445,438
Patented May 20, 1969

3,445,438
POLYMERS FROM POLYMERISABLE AMINODI-
CHLOROTRIAZINE DERIVATIVES
Hans Ludwig Honig, Erwin Alfons Müller, and Werner
Kühnel, Leverkusen, Günter Kolb, Cologne-Stamm-
heim, and Paul Elzer, Leverkusen, Germany, assignors
to Farbenfabriken Bayer Aktiengesellschaft, Lever-
kusen, Germany, a corporation of Germany
No Drawing. Filed Feb. 16, 1966, Ser. No. 527,773
Claims priority, application Germany Mar. 13, 1965,
F 45,518
Int. Cl. C08f 7/12; D06m 15/00
U.S. Cl. 260—88.3         7 Claims

ABSTRACT OF THE DISCLOSURE

Acyloxyalkylaminodichlorotriazines, homopolymers, copolymers and graft polymers thereof and the utility of said polymers for coating textile materials and for use as binders in textile printing and dyeing.

It has been found that monomers of the formula

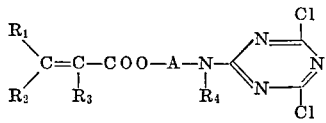

can be polymerised either individually or in admixture with other polymerisable olefinically unsaturated compounds. In this formula, $R_1$ represents a hydrogen atom, a methyl group or the group X, with the limitation that $R_2$ and $R_3$ represent hydrogen atoms when $R_1$ represents X X represents the group

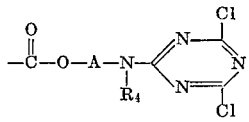

$R_2$ represents a hydrogen atom or a methyl group, $R_3$ represents a hydrogen atom, a methyl group or the group Y, with the limitation that $R_1$ and $R_2$ represent hydrogen atoms when $R_3$ represents Y

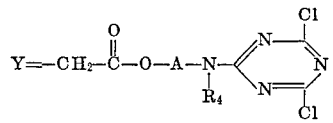

$R_4$ represents a hydrogen atom, an alkyl group with 1 to 20 carbon atoms, an optionally substituted aralkyl group such as benzyl, chlorobenzyl, nitrobenzyl or $\beta$-phenylethylene or an optionally substituted phenyl radical such as phenyl, alkylphenyl with 1 to 4 carbon atoms in the alkyl group, halogenophenyl such as chlorophenyl, bromophenyl or dichlorophenyl, nitrophenyl or a phenyl carboxylic ester group with 1 to 4 carbon atoms in the ester group, A represents an optionally branched alkylene group with 2 to 20 carbon atoms, which may be interrupted by hetero atoms such as O or S, preferably 2 to 4 carbon atoms.

Examples of suitable monomers are the following:

acryloyloxyethylamino-dichlorotriazine,
methacryloyloxyethylamino-dichlorotriazine,
methacryloyloxyethyl-N-methylamino-dichlorotriazine,
methacryloyloxyethyl-N-phenylamino-dichlorotriazine,
methacryloyloxy-propylamino-dichlorotriazine,
crotonoyloxyethylamino-dichlorotriazine,
fumaroyl-bis-(oxyethylaminodichlorotriazine),
methylenesuccinyl-bis-(propylamino-dichlorotriazine).

Compounds such as these are easy to obtain. They can be prepared by reacting the hydrohalides of aminoalkyl esters of $\alpha,\beta$-unsaturated carboxylic acids with cyanuric chloride.

Furthermore it is possible to prepare said polymersible acryloxyalkylaminodichlorotriazines by acylation of a reaction product of 1 mol trichlorotriazine and 1 mol aminoalkanol having a primary or secondary amino group with 1 to 1.1 mols of chlorides or anhydrides of $\alpha,\beta$-monoolefinically unsaturated carboxylic acids.

Suitable copolymerisable monomers include, for example, (a) $\alpha,\beta$-Unsaturated carboxylic acids, such as acrylic acid or methacrylic acid, (b) Esters of $\alpha,\beta$-unsaturated carboxylic acids, such as acrylic acid and methacrylic acid, with saturated aliphatic or cycloaliphatic alcohols with 1 to 20 carbon atoms, in particular methyl methacrylate, ethyl methacrylate, butyl acrylate, 2-hydroxyethyl acrylate or methacrylate, 2-hydroxy propyl acrylate or methacrylate and 2-aminoethyl acrylate or methacrylate hydrochloride.

(c) Amides of $\alpha,\beta$-unsaturated carboxylic acids, such as acrylamide of methacrylamide, their methylol compounds and methylol ethers with 1 to 6 carbon atoms in the alkyl ether group, (d) Nitriles of $\alpha,\beta$-unsaturated carboxylic acids, such as acrylonitrile or methacrylonitrile.

(e) Aliphatic vinyl compounds such as vinyl ethers, vinyl esters, vinyl ketones and vinyl chloride, for example, vinyl ethyl ether, vinyl acetate, vinyl propionate, chlorovinyl acetate and vinyl chloride.

(f) Aromatic vinyl compounds, such as styrene, vinyl toluene and $\alpha$-methyl styrene, or heterocyclic vinyl compounds such as 2-vinyl pyrrolidone and 2-vinyl pyridine.

(g) Vinylidene compounds, preferably vinylidene chloride.

(h) Conjugated diolefins, particularly aliphatic diolefins with 4 to 6 carbon atoms, such as butadiene, isoprene, 2,3-dimethyl butadiene and 2-chlorobutadiene.

(i) $\alpha$-monoolefins and their substituted products, such as ethylene or propylene.

(j) Divinyl compounds such as divinyl benzene, or ethylene glycol diacrylate or dimethacrylate.

Polymerization of the polymerisable acyloxyalkyl-amino-dichlorotriazine derivatives and their copolymerisation with other polymerisable compounds, may be carried out in any ratio and by any of the known polymerisation processes, i.e. by bulk, solution, emulsion or even suspension polymerisation.

Suitable polymerisation catalysts include inorganic peroxy compounds, such as potassium or ammonium persulphate, hydrogen peroxide, percarbonates, organic peroxide compounds such as acyl peroxides, for example benzoyl peroxide, alkyl hydroperoxides such as tert.-butyl-hydroperoxide, cumene hydroperoxide or p-menthane hydroperoxide or dialkyl peroxides such as di-tert.-butyl peroxide, peroxy esters such as tert.-butyl perbenzoate. It is of advantage to use the inorganic or organic per compounds in combination with reducing agents, as known per se. Suitable reducing agents are, for example, sodium pyrosulphite or bisulphite, sodium-formaldehyde sulfoxylate triethanolamine and tetraethylene pentamine.

The catalysts may be used in the quantities normally employed for polymerisation reactions of this type, i.e. in quantities from 0.01 to 5% by weight, based on the total amount of monomer.

In order to influence the molecular weight, the conventional regulators such as long-chain alkyl mercaptans, diisopropyl xanthogenate, nitro compounds or organic halogen compounds, may be used during polymerisation.

The polymerisation temperatures will vary from 0 to

150° C., preferably from 40 to 80° C., depending on the type of monomers used and on the activation systems. For bulk polymerisation, the mixtures of the polymerisable acyloxyalkylamino-dichlorotriazine derivatives, optionally with other suitable monomers, are polymerised as known per se, following the addition of radical-formers.

Homopolymerisation or copolymerisation in solution may be carried out in any solvent in which the monomeric compounds and the polymers are soluble and which do not react with the amino-dichlorotriazine derivatives. Suitable solvents are, for example, acetone, methyl ethyl ketone, toluene, dimethyl formamide, chloroform and dioxan.

Copolymerisation of the polymerisable acyloxyalkylamino-dichlorotriazine derivatives with other monomers may also be carried out in aqueous suspension, in which instance the monomer mixture is suspended in water containing a suspension stabiliser such as, for example, polymethyl vinyl ether, polyvinyl pyrrolidone, polyvinyl alcohol, methyl cellulose or calcium phosphate, and then polymerised as known per se following the addition of radical-formers.

One form of copolymerisation, which is preferably used, is copolymerisation in aqueous emulsion. In this instance, it is possible either to polymerise all the monomers together, or to start with only part of the monomer mixture and then to add the rest following initiation of the reaction.

Suitable emulsifiers include anionic, cationic and non-ionic emulsifiers, or combinations thereof.

Examples of suitable anionic emulsifiers are higher fatty acids, resin acids, acid fatty alcohol sulphuric acid esters, higher alkyl sulphonates and alkylarylsulphonates, sulphonated castor oil, sulphosuccinic acid esters and the water-soluble salts of sulphonated ethylene oxide adducts.

Suitable cationic emulsifiers include salts of quaternary ammonium or pyridinium compounds.

Suitable non-ionic emulsifiers are the reaction products of ethylene oxide with long-chain fatty alcohols or phenols, as known per se. Reaction products or more than 10 mols of ethylene oxide with 1 mol of fatty alcohol or phenol, are preferably used.

The emulsifiers referred to above may be used in a total quantity of 0.5 to 20% by weight, based on the total amount of monomer. They are preferably used in quantities of 2 to 10% by weight.

To prepare graft polymers, polymerisation or copolymerisation of the monomers may be carried out as known per se in the presence of pre-formed polymers or copolymers, for example of conjugated diolefins such as butadiene, or other pre-formed polymers carrying olefinic double bonds or other reactive groups.

The polymers and copolymers obtained in accordance with the invention are non cross-linked, readily soluble adducts which cross-link very readily at room temperature or at elevated temperatures of up to 150° C., optionally after the addition of other suitable cross-linking compounds, for example, ammonia, aliphatic and aromatic polamines or polyepoxide compounds, i.e. compounds with more than one epoxide group per molecule, as well as hydroylic compounds with more than one OH-groups per molecule.

In principle, the polymers according to the invention may also be prepared by initially polymerising the acyloxyalkylamines, optionally in the form of their salts, and by reacting the resulting polymers with trichlorotriazine. Unfortunately, this process has the disadvantage that it is incomplete and results in the formation of non-uniform polymers.

Surprisingly, the polymers prepared by the process according to the invention will cross-link under extremely moderate conditions. Cross-linking even occurs when alkaline solutions or emulsions of these polymers are dried at room temperature. The polymers themselves are made resistant to solvents.

It is also surprising that these cross-linked products bond extremely well to textile materials. They are therefore eminently suitable for coating fibrous material, that is to say fabrics or non-woven fabrics of cotton, rayon staple, wool, polyamides or polyurethanes, and for coating paper and leather.

The polymers and copolymers are particularly suitable for use as binders in textile printing and dyeing. When they are used for this purpose, the products have excellent fastness data. It is possible by the process according to the invention, by suitably combining a triazine compound corresponding to the formula given above with other polymerisable compounds in the copolymer, to prepare binders which, in addition to fastness, provide the printed fabric with a pleasant handle or feel. Further, the use of binders prepared in accordance with the invention is accompanied by a colour yield considerably greater than that which can be obtained with the conventional polymer binders fixed at an alkaline pH. At the same time, the customary outstanding properties of other known pigment binders, such as their fastness to light, the stability of the printing pastes and their "re-emulsifiability" are also obtained.

Aqueous copolymer dispersions containing up to 30% by weight of methacryloyloxyethylamino-dichlorotriazine, based on the total monomer content, and butyl acrylate, optionally together with acrylic acid, methacrylic acid, acrylamide, methacrylamide, acrylonitrile and styrene, have proved to be particularly suitable for use as pigment binders in textile printing. These dispersions are adequately compatible with the additives normally used in textile printing. Accordingly, it is possible to produce pigmented printing pastes which, apart from the pigment, contain liquid aliphatic hydrocarbons, emulsifiers, suspension auxiliaries, plasticisers, thickening agents, reactive resins and other auxiliaries normally employed in textile printing.

It is already known that aqueous polymer dispersions can be used for textile printing and dyeing or for impregnation. Most of the polymers used for this purpose contain reactive groups which react in acidic media under the influence of heat. Since many textile fibres, for example cellulose fibres, are damaged by acids, it is often necessary in practice to use products which cross-link at an alkaline pH. Cross-linking agents prepared by reacting epichlorohydrin with aliphatic diamines and triamines, are used for this purpose. Unfortunately, these products are so unstable in the alkaline medium that the printing pastes have to be acidified with volatile acids in order to prevent immediate cross-linking. The volatile acid then has to be removed by heating at, for example, 130° C. so that fixing can take place.

By contrast, the reactive polymers prepared by the process according to the invention have the advantage that they remain stable even in the alkaline medium and only cross-link after drying or, to greater advantage, during steam treatment at temperatures in the range from 80 to 150° C., preferably from 80 to 120° C. It has been found that it is possible to prepare with the polymer binders produced in accordance with the invention, printing pastes which remain effective for four weeks and longer, even after the addition of alkalis, for example hydroxides, carbonates and bicarbonates of the alkali metals, ammonia and amines.

Example 1

A solution of 30 g. of methacryloyloxyethylamino-dichlorotriazine in 150 g. of dioxane, is stirred for 5 hours in a nitrogen atmosphere at 50° C., with 0.3 g. of azodiisobutyrodinitrile. The clear solution becomes viscous. A clear hard polymer film is formed when a sample of this solution is dried on glass, for example. The polymer can be precipitated with methanol from the viscous clear solution, in the form of a viscous mass which, when dried crumbles into a white powder. The yield is quantitative (30 g.).

Example 2

The procedure of Example 1 is repeated with 0.3 g. of dibenzoyl peroxide (in place of azodiisobutyrodinitrile) at 70° C. A viscous, clear polymer solution is again formed. Following precipitation with methanol, a white powder, which does not melt at temperatures up to 300° C., is obtained in a quantitative yield as in Example 1.

Example 3

Example 1 was repeated with benzene in place of dioxan. A white viscous mass is precipitated. After it has dried, the brittle product can be crushed into white powder.

Example 4

90 g. of acrylamide and 10 g. of methacryloxyethyl-amino-dichlorotriazine are stirred in 300 ml. of acetone at 50° C. in a nitrogen atmosphere, following the addition of 1 g. of azodiisobutyrodinitrile. The clear solution becomes cloudy after 5 minutes, and a white powder is precipitated. A thick white paste is formed after only a short time. The product is suction-filtered, washed with acetone and any solvent still adhering to it is removed in vacuo at 50° C. The yield is quantitative. The results of elementary analysis shows that the copolymer contains the monomers in the ratio of the quantities in which they were polymerised. The product is soluble in water, forming a clear solution.

Example 5

200 g. of a monomer mixture of 945 g. of butyl acrylate and 105 g. of methacryloyloxyethylaminodichlorotriazine are added to a solution of 63 g. of oleyl alcohol polyglycol ether in 1575 ml. of water. The resulting emulsion is heated to 50° C. and the air displaced by nitrogen. 2 g. of potassium peroxydisulphate and 3 g. of sodium pyrosulphite are added to the stirred emulsion. Polymerisation is immediately initiated, accompanied by the evolution of heat. The rest of the monomer mixture is added dropwise into the emulsion over a period of two hours. A stable, finely divided and transparent polymer emulsion with a solids content of 40% by weight is formed.

When a sample of this emlsion is dried on glass, a soft tacky film is formed which dissolves in cold dimethyl formamide to form a clear solution. If, before drying, the sample is made alkaline with ammonia, sodium carbonate or caustic soda, a slightly harder and less tacky film is formed which is insoluble in dimethyl formamide.

Example 6

A solution of 5 g. of oleyl alcohol polyglycol ether in 200 ml. of water is stirred with 20 g. of a monomer mixture of 95 g. of butyl acrylate and 5 g. of methacryloyloxyethyl-N-phenylaminodichlorotriazine. The air is displaced by nitrogen, followed by the addition at 50° C. of 0.3 g. of potassium peroxydisulphate and 0.1 g. of sodium pyrosulphite. The rest of the monomer mixture is slowly added dropwise, and the emulsion stirred for another 5 hours at 50° C. A stable polymer emulsion with a solids content of 33% by weight is formed. A sample of this emulsion is poured into methanol, as a result of which the polymer is precipitated. The results of nitrogen and chlorine measurement show that the copolymer contains the monomers in the ratio of the quantities in which they were polymerised.

Example 7

Monomer mixtures of butyl acrylate and methacryloyloxypropylamino-dichlorotriazine, or methacryloyloxyethyl-N-methylaminodichlorotriazine or crotonoyloxyethylamino-dichlorotriazine, are polymerised as described in Example 6.

Example 8

2325 ml. of water, 105 g. of oleyl alcohol polyglycol ether and 250 g. of a solution of 175 g. of methacryloyloxy-ethylamino1dichlorotriazine in 1138 g. of butyl acrylate, are introduced into a 6-litre autoclave equipped with stirring mechanism, from which the air is displaced by repeated evacuation and flushing with nitrogen. Solutions of 3.5 g. of potassium persulphate in 200 ml. of water and 1.5 g. of sodium pyrosulphite in 100 ml. of water are then successively introduced under pressure at 50° C. The rest of the monomer mixture is then added over a period of thirty minutes, followed later by the introduction under pressure of 131 g. of acrylonitrile and 306 g. of butadiene over a period of a few minutes. Stirring is then continued for another 5 hours at 50° C. The polymer content of the stable emulsion is determined by concentrating a weighed sample by evaporation, and amounts to 39% by weight.

Example 9

0.7 g. of potassium peroxydisulphate and 1.0 g. of sodium pyrosulphite are added with stirring at 50° C. in a nitrogen atmosphere, to a mixture of 525 ml. of water, 17.5 g. of the sodium salt of a long-chain alkyl sulphonic acid, 15 g. of acrylamide and 60 g. of a monomer mixture of 300 g. of ethyl acrylate and 35 g. of methacryloyloxy-ethylamino-dichlorotriazine. The mixture spontaneously heats up to 65° C. When the reaction subsides, the rest of the monomer mixture is added dropwise over a period of two hours, and the resulting mixture is stirred for another five hours. A stable 40% by weight polymer emulsion is formed. The chlorine content of a sample precipitated with methanol and dried in vacuo is 2.5% by weight.

Example 10

1 g. of potassium peroxydisulphate and 1.6 g. of sodium pyrosulphite are added with stirring at 50° C. in a nitrogen atmosphere, to a mixture of 300 ml. of water, 0.1 g. of tert.-dodecyl mercaptan, 10 g. of o-benzyloxy-diphenyl polyglycol ether and 50 g. of a monomer mixture of 120 g. of butyl acrylate, 8 g. of methacryloyloxy-ethylamino-dichlorotriazine, 60 g. of styrene, 6 g. of methacrylic acid and 8 g. of 2-hydroxypropyl methacrylate. When the exothermic reaction subsides, the rest of the monomer mixture is added dropwise over a period of two hours. A stable 40% by weight polymer emulsion is obtained.

Example 11

To 200 parts by weight of a polymer emulsion according to Example 1 there are added 100 parts by weight of a 30% by weight dispersion of carbon black (Philblack A) in water, 40 parts by weight of a 20% by weight aqueous soda solution, 50 parts by weight of a 4% by weight aqueous solution of sodium alignate used as the thickening agent, and 10 parts by weight of an emulsifier.

600 parts by weight of heavy petrol (boiling range 120–220° C.) are dispersed in this mixture by means of a high-speed stirrer (approx. 3,000 r.p.m.). A "flexible" paste of average viscosity is formed which, when roller-printed on to cotton, rayon staple or polyamide fibers, produces a deep black shade which, after fixing for five minutes at 130° C., remains highly resistant both to washing and rubbing. The prints can be equally firmly fixed by steam treatment for 5 minutes at 100 to 103° C.

Example 12

200 parts by weight of an approximately 40% by weight aqueous polymer emulsion comprising 55% by weight of butyl acrylate, 30% by weight of styrene, 10% by weight of methacryloyloxy-N-methylaminodichlorotriazine and 5% by weight of methacrylic acid are mixed with 50 parts by weight of a 40% by weight aqueous dispersion of a copper phthalo-cyanine dye, 50 parts by weight of a 5% by weight solution of sodium carboxymethyl cellulose, 50 parts by weight of a 20% by weight aqueous soda solution and 10 parts by weight of the reaction product of 1 mol of cetyl alcohol and 15 mols of ethylene oxide. 600 parts by weight of heavy petrol are emulsified into this mixture.

Applied by roller- or cylinder-printing, this paste produces a deep blue shade on cotton, staple rayon or polyamide which, after fixing, remains extremely fast to wet processing, even when the printing paste is stored for several weeks, there is no apparent deterioration in the fastness of the prints produced with it.

Example 13

150 parts by weight of an approximately 40% by weight aqueous polymer emulsion comprising 85% by weight of butyl acrylate, 5% by weight of acrylonitrile and 10% by weight of methacryloyloxy-propylamino-dichlorotriazine, are mixed with 50 parts by weight of an aqueous dispersion of the redazo dye of diazotised 9-amino-1-methoxy-benzene-4-sulphodiethylamide and 1-(2',3'-hydroxynaphoylamino)-2,4-dimethoxy - 4 - chlorobenzene, 50 parts by weight of a 5% by weight aqueous solution of a highly viscous sodium alginate, 25 parts by weight of a 20% by weight solution of the reaction product of dipropylene triamine and epichlorhydrin in hydrochloric acid and 725 parts by weight of a 70% by weight emulsion of heavy petrol in water. This printing paste is applied by screen printing to cotton, rayon staple or polyamide fabric. A bright red shade is formed which remains fast to rubbing after fixing by steam treatment at 100 to 103° C.

We claim:
1. A polymerizable compound of the formula

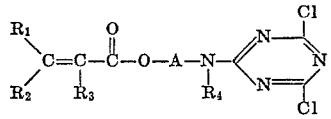

wherein
$R_1$ stands for hydrogen, methyl or X with the proviso that $R_2$ and $R_3$ stand for hydrogen when $R_1$ stands for X,
X stands for

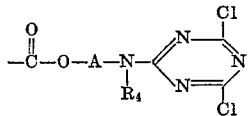

$R_2$ stands for hydrogen or methyl,
$R_3$ stands for hydrogen, methyl or Y with the proviso that $R_1$ and $R_2$ stand for hydrogen when $R_3$ stands for Y,
Y stands for

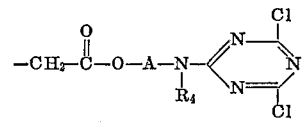

$R_4$ stands for hydrogen, an alkyl radical having up to 20 carbon atoms, an aralkyl radical or a phenyl radical, and A stands for alkylene having from 2 to 20 carbon atoms or said alkylene interrupted by oxygen.

2. A polymerizable compound according to claim 1 wherein A stands for alkylene having from 2 to 20 carbon atoms or said alkylene interrupted by oxygen and $R_4$ represents hydrogen, alkyl having up to 20 carbon atoms, benzyl, chlorobenzyl, nitrobenzyl, phenyl ethylene, phenyl, alkyl phenyl having up to 4 carbon atoms in the alkyl group, halo phenyl, nitro phenyl or phenyl carboxylic ester having up to 4 carbon atoms in the ester group.

3. A polymerizable compound having the formula

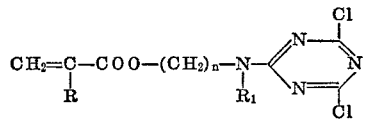

wherein R stands for hydrogen or methyl, $n$ stands for an integer of from 2 to 4 and $R_1$ stands for hydrogen, alkyl having up to 3 carbon atoms, phenyl or benzyl.

4. Polymers containing polymerized units of a polymerizable compound according to claim 1.

5. Polymers containing polymerized units of a polymerizable compound according to claim 3.

6. A copolymer formed by polymerizing a polymerizable compound according to claim 1 with a copolymerizable monomer.

7. A copolymer formed by polymerizing a polymerizable compound according to claim 3 with a copolymerizable monomer.

References Cited

UNITED STATES PATENTS 2,934,525  4/1960  Fekete _____ 260—88.3
3,056,760  10/1962 D'Alelio _____ 260—88.3

HARRY WONG, Jr, *Primary Examiner.*

U.S. Cl. X.R.

117—138.8, 140, 142, 143, 155; 260—32.6, 41, 79.7, 80.72 63, 83.5, 85.5, 86.1, 86.3, 86.7, 249.5, 879